United States Patent [19]

Lipschutz

[11] Patent Number: 4,827,942
[45] Date of Patent: May 9, 1989

[54] FLOW MAP APPARATUS

[75] Inventor: David Lipschutz, Lexington, Mass.

[73] Assignee: Hewlett-Packard Company, Palo Alto, Calif.

[21] Appl. No.: 166,827

[22] Filed: Mar. 4, 1988

Related U.S. Application Data

[63] Continuation of Ser. No. 748,531, Jun. 25, 1985, abandoned.

[51] Int. Cl.[4] ............................................. A61B 10/00
[52] U.S. Cl. ............................. 128/661.08; 358/112; 358/82
[58] Field of Search ............................. 128/660, 663; 73/861.25; 342/181; 358/48, 56, 81, 82

[56] References Cited

U.S. PATENT DOCUMENTS

| 4,205,687 | 6/1980 | White et al. | 128/663 |
| 4,228,804 | 10/1980 | Holasek et al. | 128/660 |
| 4,641,668 | 2/1987 | Namekawa | 128/663 |

OTHER PUBLICATIONS

Nomekawa, K., "UTS Bloodflow Imaging System", Europ. Pat. Appln. 0 100 094 publ. Aug. 2, 1984.
Piger, S. M., "Color Display Ultrasonography", UTS in Med. & Biol., V.#9, No. 4, pp. 331–345.

Primary Examiner—Francis Jaworski
Attorney, Agent, or Firm—Donald N. Timbie

[57] ABSTRACT

Ultrasonic apparatus for representing the velocities of flow of fluid occurring with an image plane by changing the hue and intensity of the colors with changes in flow rate.

4 Claims, 1 Drawing Sheet $R = B = G = 0.$

For flows greater than the threshold value that are on a direction toward the observer, $R = 0,$ $B = \text{CLIP}(a \cdot F + b),$ $G = \text{CLIP}(c \cdot F + d \cdot F^2 + e \cdot F^3) + q.$ For flows greater than the threshold value that are in a direction away from the observer.

$R = \text{CLIP}(v \cdot F + w),$ $B = 0,$ $G = \text{CLIP}(x \cdot F + y \cdot F^2 + z \cdot F^3) + p.$ The function CLIP of y is defined as follows:

$$\left\{ \begin{array}{l} y \text{ if } y < 1 \\ 1 \text{ if } y \geq 1 \end{array} \right\}$$

Because of the squared and cubed terms the amount of green that is added to blue for flows toward the observer and to red for flows away from the observer increase non-linearly with the rate of flow, whereas the red and blue increase linearly. The resulting change in the ratio of the colors changes the hue, and the fact that the two colors are increasing in intensity also increases the brightness.

In the CIE color triangle of FIG. 4, the primary colors employed by the monitor 4 as indicated at points R, B and G: Above the threshold value for flow coming toward the observer, the hue goes from blue toward green along a path $P_T$; and above the threshold value for flow going away from the observer, the hue goes from red toward green along a path $P_A$. FIG. 2 generally illustrates the changes in the intensities of blue and green light when the flow is toward the observer, and FIG. 3 generally illustrates the changes in the intensities of red and green light where the flow is away from the observer.

Although various values maybe used for the constants used in the above equations, the following have been found to produce very good results. Note that everything is normalized.

$a = .98$ $b = .35$ $c = 0$ $d = .51$ $e = .47$ $q = 0$ $v = .94$ $w = .47$ $x = 0$ $y = .37$ $z = .51$ $p = 0$

In the particular embodiment thus far described, the threshold colors have been two primary colors and the changes in hue resulting from an increase in flow has been toward the third primary color as illustrated by the paths $P_T$ and $P_A$, but it is within the purview of the invention to start with any color within the color triangle formed by the primaries R, B and G and proceed along a path that may be curved or straight to any other color in the triangle by respectively changing the intensity of two or more primary colors in one direction so as to change the hue and intensity of the resultant light with changes in the flow rate.

Note that all the primary colors are increased and decreased in intensity by the two dimensioned image signal so as to control the brightness of the two dimensional image so as to superimpose it on the colored flow map.

What is claimed is:

1. An ultrasonic system for displaying the velocities with which blood flows in opposite directions at different points in a cross section of a body, comprising
   means for providing signals indicating the velocity of blood flow at successive points along scanned paths in said cross section,
   means for providing direction signals indicating the direction of blood flow along said paths at each of said points,
   image forming means for forming an image representing the velocity and direction of the blood flow in said section by combining three primary colors, defining a color triangle, and
   control means coupled between said means for providing velocity signals and said means for providing direction signals and said image forming means for controlling said image forming means in such manner that it changes the relative amounts of the three primary colors produced in the image by said image forming means so as to produce a change in hue along a first path on one side of the color triangle as the velocity of blood flow in one direction increases, a change in hue along a different path on a different side of the color triangle that does not intersect the first path as the velocity of blood flow in the opposite direction increases, and a change in brightness along each path that increases from a minimum value other than zero as the respective velocities of flow increase from zero.

2. Ultrasonic apparatus as set forth in claim 1 in which said control means causes the colors to be produced by the addition of the three primary colors R, G and B in accordance with the following expressions wherein a−e, p, q. v−w and x−z are constants,
   when the velocity of flow F is below a given minimum, $R = B = G = 0;$ when the velocity of flow is in one direction, $R = 0,$ $B = \text{CLIP}(a*F + b),$ $G = \text{CLIP}(c*F + d*F2 + e*F3) + q;$

FLOW MAP APPARATUS

CROSS REFERENCE TO RELATED APPLICATION

This application is a continuation of application Ser. No. 748,531, filed June 25, 1985, now abandoned.

BACKGROUND OF THE INVENTION

Two-dimensional images of structure of portions of the human body such as the heart are presently formed from the reflections of ultrasonic waves that are transmitted into the body.

It is also possible to determine the velocity with which blood is flowing toward and away from points in the image by using a pulsed Doppler system. An image of the velocity distribution thus attained can be superimposed on the structural image if desired.

The velocity distribution can be represented by shades of grey, but this has not been very meaningful. Furthermore, it is sometimes difficult to distinguish the velocity image from the structural image. Therefore, it has been proposed that one set of colors be respectively and arbitrarily assigned to each of a plurality of velocity ranges for blood moving in one direction, and that a different set of colors be respectively and arbitrarily assigned to each of a plurality of velocity ranges for blood moving in the opposite direction. A serious disadvantage of this method of forming a flow map is that there is no natural association of any particular color with a given velocity.

It has therefore been proposed that a red color of fixed hue be used to represent flow in one direction and that a blue color of fixed hue be used to represent flow in the other direction. Increasing velocities are represented by increasing the intensity of the appropriate color, but without a change in hue.

The problem with this type of display is that it is very difficult to perceive the difference between the various velocities because all the reds tend to look the same and all the blues tend to look the same. This is especially true for the lower levels of velocity.

BRIEF STATEMENT OF THE INVENTION

In accordance with this invention the differences in velocity are made more apparent by changing both intensity and hue as the velocity changes. This is done in such a way that there is a natural rather than an arbitrary change in hue as the velocity changes and that the colors representing velocities in one direction are distinct from the colors representing the velocities in the other direction.

By way of example, satisfactory results have been attained by representing velocities below an arbitrarily selected threshold by black, velocities of flow toward the observer that just exceed the threshold by a fairly bright blue, and velocities of flow away from the observer that just exceed the threshold by a fairly bright red. Thus the low velocities are observable. As the velocity of the flow toward the observer increases beyond the threshold, the intensity of the blue light is increased and an increasing amount of green light is added to it so as to further increase the intensity of the mixture. A desired change in hue in a path in the color triangle from blue toward green is attained by increasing the ratio of the green-to-blue light as the velocity increases. Similarly, as the velocity of the flow away from the observer increases beyond the threshold, the intensity of the red light is increased and an increasing amount of green light is added to it so as to further increase the intensity of the mixture. A desired change in hue in a path in the color triangle from red toward green is attained by increasing the ratio of the green-to-red light as the velocity increases.

The color selected for the velocities just above the threshold may be located anywhere in the color triangle and the change in hues may be along any paths from these colors. Preferably, however, the paths do not intersect. In any event, a change in hue along a given path is a natural progression that is easily associated with a change in velocity in the mind of the observer, especially if the progression in hue is accompanied by an increase in intensity.

DETAILED DESCRIPTION OF THE INVENTION

Figure 4:
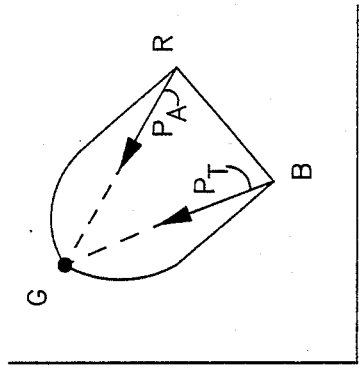
FIG. 4 shows the well-known color triangle.
Figure 3:
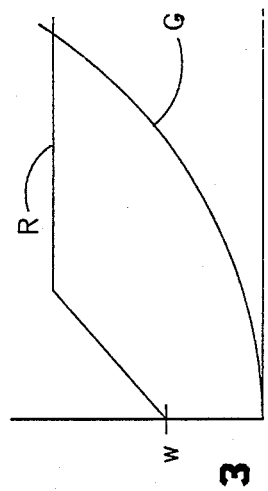
FIG. 3 is a graph illustrating changes in intensity of red and green light as a function of the velocity of flow away from the observer.
Figure 1:
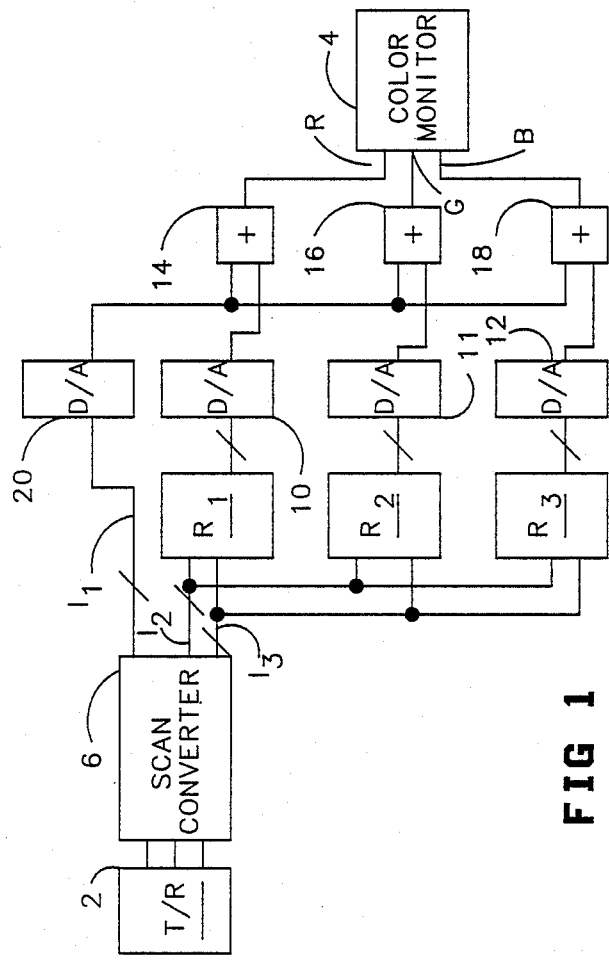
FIG. 1 is a block diagram of a system for forming a flow map in color in accordance with this invention.
Figure 2:
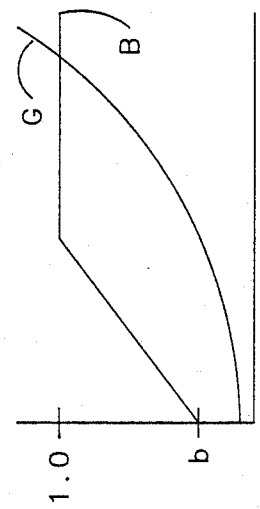
FIG. 2 is a graph illustrating changes in intensity of blue and green light as a function of the velocity of flow toward an observer.

In FIG. 1, an ultrasonic transceiver 2 transmits ultrasonic energy into a body under examination and converts the reflections thereof into digital signals representing a two-dimensional image of the body structure and into digital signals representing the magnitude and direction of the velocity of any movement occurring in the image.

Inasmuch as the data may be attained along radial lines, as when T/R uses a phased array, and is to be reproduced on a monitor 4 having a raster of parallel lines, the signals are applied to a scan converter 6 which outputs a digitized video signal for the two-dimensional image on a line $1_1$; a signal indicating the direction of flow at each point in the image area on a line $1_2$; and a signal indicating the magnitude of the flow on a line $1_3$. The signals on lines $1_2$ and $1_3$ are applied to three ROMs $R_1$, $R_2$ and $R_3$ that respectively convert the direction and magnitude information into digital signals representing the amplitudes of red, green and blue that are to be displayed on the monitor 4. The outputs of the ROMs $R_1$, $R_2$ and $R_3$ are respectively applied to D/A converters 10, 11 and 12 and their outputs are respectively connected to inputs of adders 14, 16 and 18. The signals for the two-dimensional image that are on $1_1$ are applied via a D/A converter 20 to inputs of the adders 14, 16 and 18, and their outputs are applied to inputs R, G and B of the color monitor 4 that respectively control the amounts of red, green and blue light which it produces.

Whereas the ROMs $R_1$, $R_2$ and $R_3$ can be programmed so as to produce any combination of color and intensity that is desired for the various amounts and directions of flow, the equations set forth below define the type of combination in general terms that has been found to be meaningful.

For zero velocity flow and flows below a given threshold value, and when the velocity of flow F is in the opposite direction, $R = \text{CLIP}(v*F+w),$ $B = 0,$ $G = \text{CLIP}(x*F+y*F^2+z*F^3)+p.$ 3. Ultrasonic apparatus as set forth in claim 2 wherein a=0.98, b=0.35, c=0, d=0.51, e=0.47, v=0.94, w=0.47, x=0, y=0.37, z=0.51, q=0 and p=0.

4. A system as set forth in claim 1 wherein said control means causes said first path to be between first and second primary colors and said second path to be between a third primary color and one of said first and second primary colors.

* * * * *